United States Patent
Ross et al.

(10) Patent No.: US 12,507,616 B2
(45) Date of Patent: Dec. 30, 2025

(54) ROOT CROP HARVESTER

(71) Applicant: Grimme Landmaschinenfabrik GmbH & Co. KG, Damme (DE)

(72) Inventors: Julian Ross, Eslohe (DE); Wolfram Strothmann, Osnabrück (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 555 days.

(21) Appl. No.: 17/998,080

(22) PCT Filed: May 7, 2021

(86) PCT No.: PCT/EP2021/062200
§ 371 (c)(1),
(2) Date: Nov. 7, 2022

(87) PCT Pub. No.: WO2021/224476
PCT Pub. Date: Nov. 11, 2021

(65) Prior Publication Data
US 2023/0172099 A1    Jun. 8, 2023

(30) Foreign Application Priority Data
May 7, 2020   (DE) .......................... 102020112427.9

(51) Int. Cl.
*A01D 33/04* (2006.01)
*A01D 33/08* (2006.01)

(52) U.S. Cl.
CPC ............. *A01D 33/04* (2013.01); *A01D 33/08* (2013.01)

(58) Field of Classification Search
CPC ................................ A01D 33/04; A01D 33/08
See application file for complete search history.

(56) References Cited

U.S. PATENT DOCUMENTS

| | | | |
|---|---|---|---|
| 3,435,950 A | 4/1969 | Suverkrop | |
| 3,872,306 A | 3/1975 | Palmer | |
| 4,281,764 A | 8/1981 | Fowler, Jr. | |
| 4,324,336 A * | 4/1982 | Sandbank | A01D 33/04 209/637 |
| 4,351,437 A | 9/1982 | Long | |

(Continued)

FOREIGN PATENT DOCUMENTS

| | | |
|---|---|---|
| CN | 110072379 A | 7/2019 |
| DE | 928017 C | 5/1955 |

(Continued)

*Primary Examiner* — Nicole Coy
(74) *Attorney, Agent, or Firm* — Husch Blackwell LLP

(57) ABSTRACT

A root crop harvester is provided, including a feed conveyor device for conveying conveyable material consisting of harvested crop and additional materials in a feed conveying direction. The root crop harvester also includes a separating device having at least one separating element for separating the additional materials from the harvested crop. The separating device has a conveyable material sensor, which is coupled to a first EDP evaluation unit and, during operation, is directed toward the conveyable material, and which is intended for recording conveyable material data. The conveyable material sensor may be directed toward the feed conveyor device during operation. In addition, the conveyable material sensor may be an optical conveyable material sensor.

21 Claims, 9 Drawing Sheets

(56) References Cited

U.S. PATENT DOCUMENTS

| | | |
|---|---|---|
| 4,466,543 A | 8/1984 | Zwahlen et al. |
| 4,895,209 A | 1/1990 | Margolin et al. |
| 5,197,607 A | 3/1993 | Hakansson |

FOREIGN PATENT DOCUMENTS

| | | |
|---|---|---|
| DE | 2319721 A1 | 10/1973 |
| DE | 2709905 A1 | 9/1977 |
| DE | 282385 A5 | 9/1990 |
| EP | 3627141 A1 | 3/2020 |
| GB | 2428548 A | 2/2007 |
| JP | S52150253 A | 12/1977 |
| JP | S5914519 U | 1/1984 |
| JP | 02043978 A | 2/1990 |
| JP | 2018001115 A | 1/2018 |
| WO | 2019076932 A2 | 4/2019 |
| WO | 2019197554 A1 | 10/2019 |

\* cited by examiner

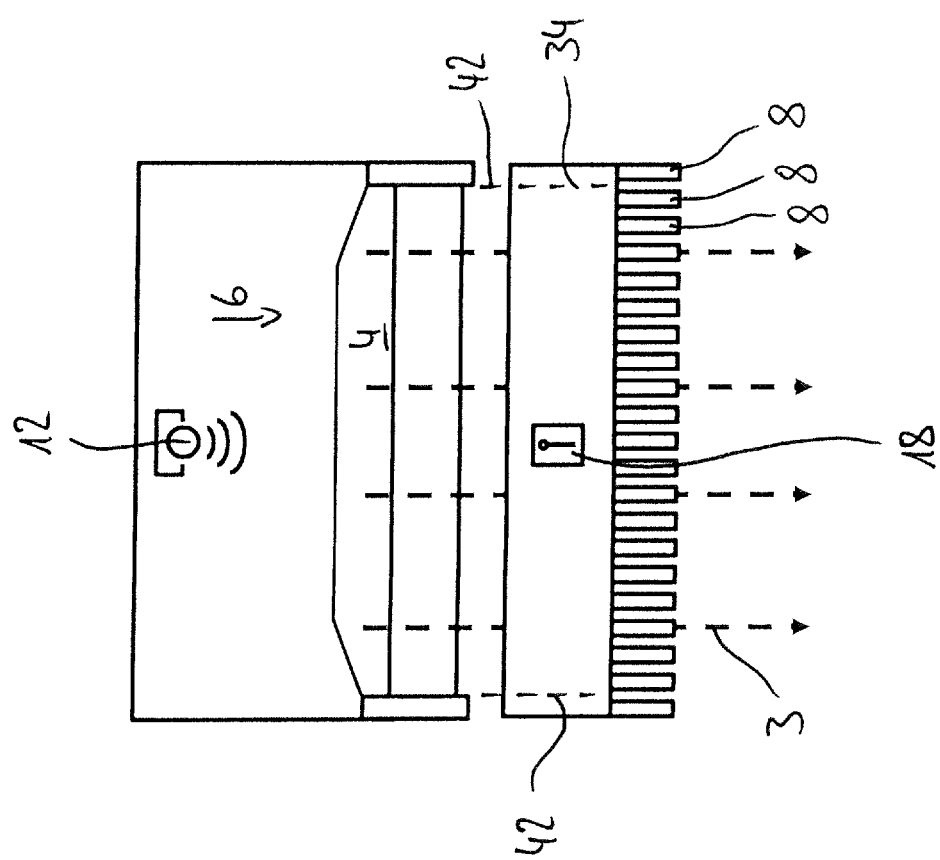

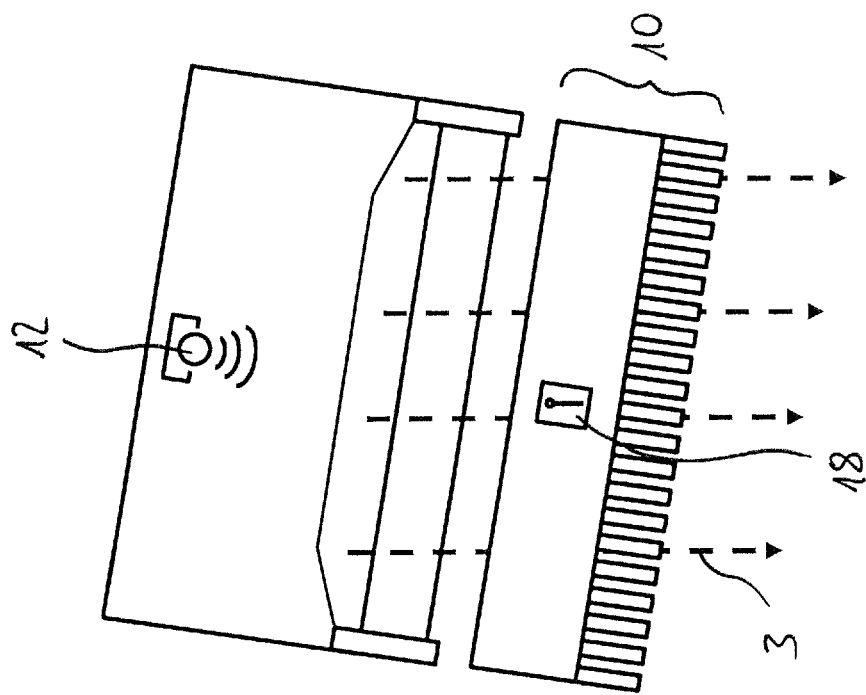

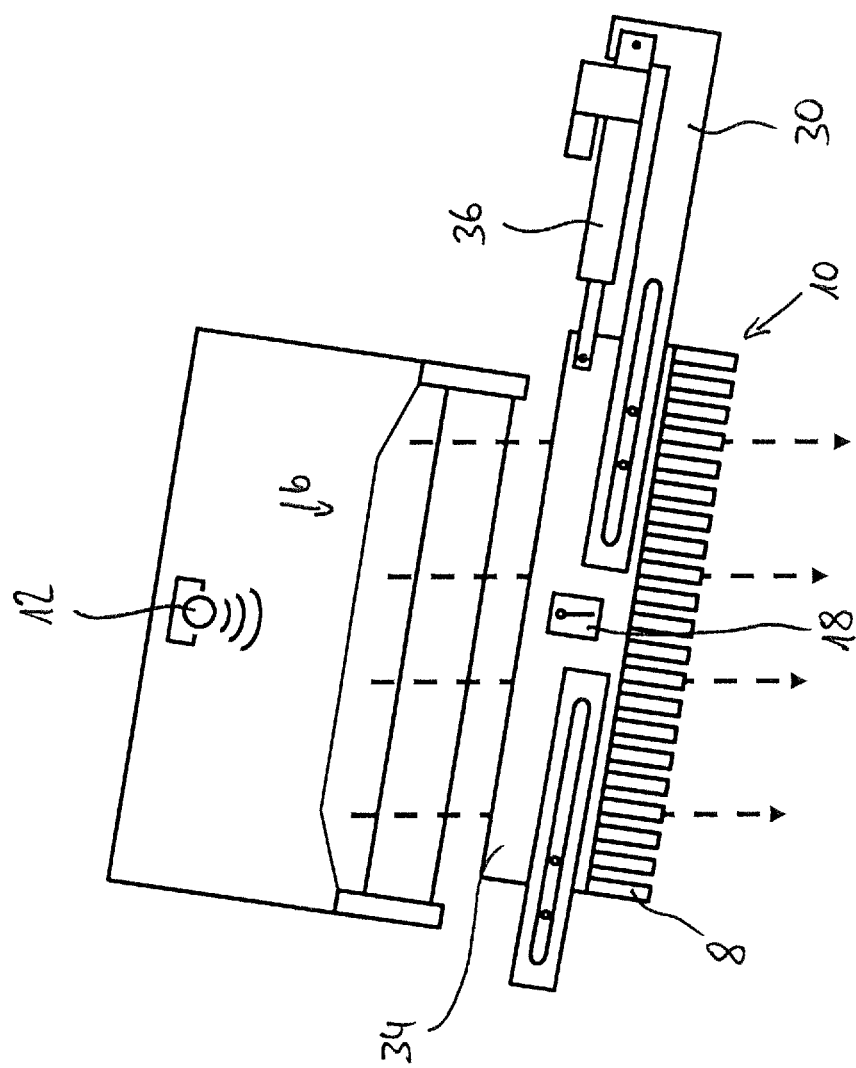

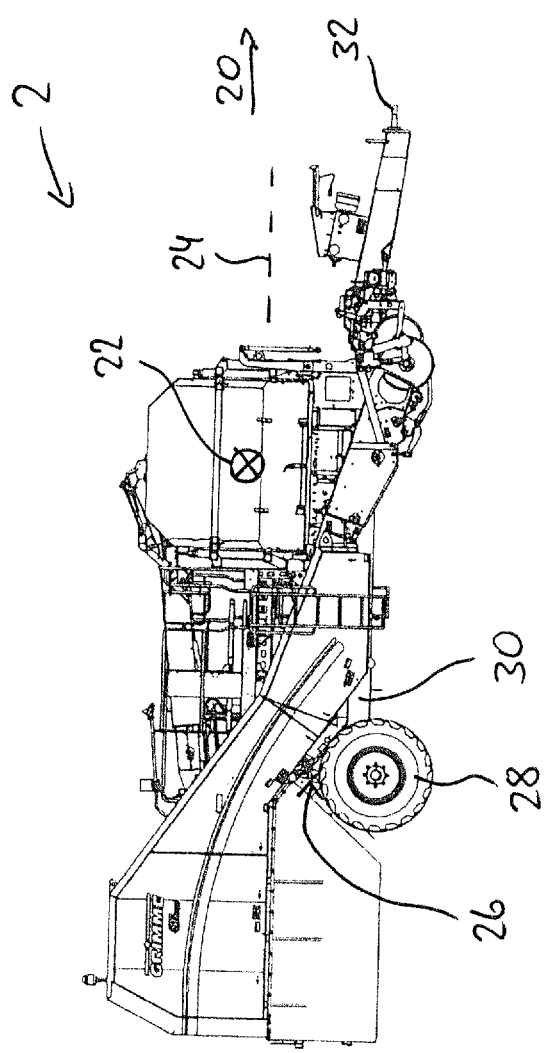

ROOT CROP HARVESTER

CROSS REFERENCE

This application claims priority to PCT Application No. PCT/EP2021/062200, filed May 7, 2021, which itself claims priority to German Patent Application No. 10 2020 112427.9, filed May 7, 2020, the entireties of both of which are hereby incorporated by reference.

FIELD OF THE INVENTION

The invention relates to a root crop harvester, comprising a feed conveyor device for conveying conveyable material consisting of harvested crop and additional materials in a feed conveying direction. In addition, the root crop harvester comprises a separating device having at least one separating element for separating the additional materials from the harvested crop. The separating device comprises a conveyable material sensor, which is coupled to a first EDP evaluation unit and, during operation, is directed toward the conveyable material, and which is intended for recording conveyable material data. In particular, the conveyable material sensor is directed toward the feed conveyor device during operation. In addition, the conveyable material sensor is in particular an optical conveyable material sensor.

BACKGROUND OF THE INVENTION

In the case of the known root crop harvesters, during operation the feed conveyor device conveys the conveyable material to the separating device. The latter acts at least on the additional materials of the conveyable material in such a manner that the additional materials are separated as far as possible from the harvested crop. The use of the conveyable material sensor is known for calculating harvested crop yields.

A disadvantage of the known root crop harvesters is that their separating device, in particular during operation of the root crop harvester on slopes, firstly only separates an insufficient portion of the overall additional materials from the harvested crop and secondly unintentionally also separates some of the harvested crop together with the additional materials from the rest of the harvested crop or damages the harvested crop.

BRIEF SUMMARY OF THE INVENTION

It is the object of the present invention to provide a root crop harvester and a method for operating same, by means of which the above-described disadvantages are avoided.

According to the invention, the separating device comprises a plurality of separating elements which, as viewed in the feed conveying direction, are at least partially arranged next to one another. The separating elements are individually actuable by the EDP evaluation unit depending on the conveyable material data.

A root crop harvester is a mobile machine which is self-propelled or is towed by a tractor during operation and which is used directly in the field. The root crop harvester is suitable in particular for harvesting crop, preferably in the form of potatoes or beets. The feed conveyor device comprises in particular a sifting belt, i.e. a conveyor belt having a non-closed supporting surface, or is preferably designed as a roller table.

The conveyable material sensor is arranged during operation in particular above the conveyable material toward which it is directed. It is preferably arranged above the feed conveyor device and furthermore preferably is directed at least substantially perpendicularly to the feed conveyor device. In a further preferred refinement, the conveyable material sensor is directed toward a region between the feed conveyor device and a conveyor device following in the conveying direction, in particular toward the region of a drop step. The conveyable material sensor is designed in particular as a camera, preferably as a line-scan camera, 2D or 3D camera. In particular, the conveyable material sensor is designed for recording color information. Alternatively, the conveyable material sensor is preferably designed as ultrasound sensor, light barrier or the like. A conveyable material sensor can also comprise a combination of a plurality of sensors, e.g. an image sensor and a depth sensor.

During operation, the conveyable material data recorded by the conveyable material sensor are transmitted to the EDP evaluation unit. For this purpose, the conveyable material sensor is coupled to the evaluation unit in particular in a wireless or wired fashion. The evaluation unit comprises in particular a processor and a memory for processing at least the conveyable material data. During operation, the evaluation unit is preferably arranged on the root crop harvester; as an alternative thereto, during operation, the evaluation unit is preferably arranged on a tractor coupled to the root crop harvester.

The EDP evaluation unit is designed for the separate actuation of individual separating elements. In particular, the sections of the separating elements which are designed for acting on the conveyable material are entirely next to one another. Preferably, the separating elements are arranged one behind another, when viewed in a horizontal transverse direction at a right angle to the feed conveying direction, and therefore, in particular in a corresponding position of the separating elements, only the one closest to the observer is visible.

During operation of the root crop harvester according to the invention, the EDP evaluation unit determines the position of root crops and/or additional materials, in particular the position thereof in the transverse direction, on the basis of the conveyable material data. For this purpose, use is made in particular of identification algorithms. On the basis of the position information and in particular the conveying speed of the feed conveyor device, the EDP evaluation unit calculates which separating element should be actuated when in order to separate the root crops and/or the additional material component from the further stream of conveyable material. In this case, the separating element which has a transverse direction coordinate corresponding to that of the component to be separated is actuated. The further separating elements can remain unactuated so as not to intentionally separate further components from the conveyable material or to damage harvested crop.

One effect achieved by this targeted use of the separating elements is that additional material components, such as stones and weeds, can be separated in more targeted and therefore more reliable fashion from the harvested crop without involving harvested crop being unintentionally separated therewith. This achieves a significantly higher efficiency for the separating device in comparison to conventional separating devices on root crop harvesters.

The separating device comprises in particular at least 3, preferably at least 5, particularly preferably at least 10, at least 30 or at least 50 separating elements; in one advantageous refinement of the invention, the separating device has up to or precisely 60 separating elements. A supporting surface of the feed conveyor device has in particular a width, as measured in the transverse direction, of at least 500 preferably of at least 1000 mm, particularly preferably of at least 1500 mm and/or up to 2000 mm. The number of separating elements depends in particular on the width thereof and the width of the feed conveyor device. Preferably, the feed conveyor device has conveying parcels, which are separated from one another both in the feed conveying direction and also separated from one another transversely with respect to the feed conveying direction, for each receiving a root crop or a component of the additional materials. Preferably, each parcel offset in the transverse direction is assigned at least, in particular precisely, one separating element.

Preferably, the separating device is arranged downstream with respect to the feed conveyor device. In particular, the separating device is arranged upstream with regard to a further conveyor device adjoining the feed conveyor device. In particular, the further device is the device directly following the feed conveyor device along the stream of conveyable material. In this embodiment of the invention, the separating device is therefore arranged in the region of a drop step, as a result of which the separating elements can act on the root crops and/or the additional material components as they drop. This is advantageous since, in the region of the drop step, the conveyable material components are at greater distances from one another and can therefore be reliably detected, and for which purpose, in addition, only low forces have to be applied by the separating elements.

The separating elements are preferably arranged on a separating device frame in such a manner that they are movable from an inoperative position into an ejection position and back. In particular, the separating elements are arranged on the separating device frame so as to be pivotable and/or have an ejection surface which is designed for contact with the component to be separated in the ejection position. In this case, each separating element is assigned at least one ejector adjustment element. In particular, the separating elements in this refinement are transferred from the inoperative position into the ejection position when they are actuated. As a result, during operation, the separating elements can butt against conveyable material components or can deflect the latter and can thus separate them from the remaining conveyable material. In particular the ejector adjustment elements, which are preferably designed as hydraulic cylinders, pneumatic cylinders or adjustment elements to be moved electrically, are activated by the EDP evaluation unit. In particular, the separating elements comprise a pivot bearing on their upper side and are suspended thereon so as to be movable with respect to a separating device frame and/or a machine frame. Particularly preferably, the separating elements have further positions in addition to the inoperative position and the ejection position and an actuation of the separating elements means only a change in the position thereof. In this way, in particular sorting for example of root crops of different sizes or of different additional material components can be undertaken, as a result of which they are transferred differently from the separating elements.

In a further development of the invention, the separating elements each form at least one fluid outlet opening. In particular, the separating elements each have an actuable fluid adjustment element here. In particular, the fluid outlet opening is formed by a nozzle and/or is suitable for discharging air and, for this purpose, should be connected in particular to a compressed air store. By means of the fluid streams emerging from the actuated separating elements during operation, in particular the path of movement or flight path of the components that are to be separated can be influenced in such a manner that they are separated gently from the further conveyable material. The separating elements are formed here in particular on a common housing or preferably integrally.

The fluid adjustment elements and/or the ejector adjustment elements are preferably formed by separate components or devices. Alternatively, a plurality of the fluid adjustment elements and/or of the ejector adjustment elements is formed at least concomitantly by a common component or a common device. The common component is designed in particular as a line containing fluid during operation or as an electrical conductor.

The root crop harvester preferably has at least one inclination sensor which is encompassed in particular by the separating device. The inclination sensor is designed to measure an inclination of the root crop harvester or the separating device and/or the feed conveyor element. In addition, the inclination sensor is designed to output inclination data to an EDP control unit coupled to the inclination sensor. The inclination sensor is designed in particular for measuring an inclination in relation to a perpendicular. The inclination sensor is connected to the EDP control unit in particular in wireless or wired fashion and, during operation, transmits inclination data to the EDP control unit. In a preferred refinement of the invention, the EDP evaluation unit and the EDP control unit are encompassed by a master EDP unit or are formed by the same EDP unit.

The inclination sensor is preferably designed to measure an inclination about a pitch axis oriented transversely with respect to the direction of travel and/or to measure an inclination about a roll axis oriented in the direction of travel. The pitch axis is in particular parallel to the transverse direction. The roll axis, and therefore also the direction of travel, are in particular parallel to the roll axis. Since the conveyor devices of root crop harvesters generally convey either substantially in the direction of travel or substantially in the transverse direction, the hereby measured inclinations are the most relevant for the operation of the root crop harvester.

In an advantageous refinement of the invention, the EDP control unit is designed for setting at least one chassis adjustment element depending on the inclination data. The chassis adjustment element is designed for adjusting at least one chassis element relative to the machine frame. The chassis element is in particular an axle or a spindle of the chassis of the root crop harvester. In particular, the root crop harvester has one chassis adjustment element per side of the vehicle or per wheel. The chassis adjustment element is designed in particular as an hydraulic cylinder which is preferably arranged at one end on the machine frame and at the other end on the chassis element.

By setting the chassis adjustment element depending on the inclination data, both compensation of an inclination about the roll axis and compensation of an inclination about the pitch axis of the root crop harvester can be implemented. In the case of a plurality of chassis adjustment elements, in order to compensate for an inclination about the roll axis, in particular the chassis adjustment element on the higher side of the root crop harvester can be shortened, while the opposite one is extended. In the event of a fixed inclination about the pitch axis of the root crop harvester, the inclination can be eliminated by synchronous shortening or lengthening of the chassis adjustment elements of the same vehicle axle. In particular, the root crop harvester comprises a pickup adjustment element which, when the chassis adjustment element is actuated, pivots the pickup, which has been submerged in the soil during operation of the root crop harvester, together with the lifting shares in relation to the machine frame in such a manner that the operation of said pickup remains unrestricted.

Alternatively or additionally to the chassis adjustment element, the EDP control unit is designed for setting at least one drawbar adjustment element depending on the inclination data. The drawbar adjustment element is designed for adjusting a coupling element, which is arranged for coupling the root crop harvester to a tractor, relative to the machine frame. In particular, a towing eye or a ball head of the root crop harvester can be pivoted or displaced in relation to the machine frame thereof by the drawbar adjustment element such that the height of the coupling element is changed. This design of the invention also makes it possible to provide compensation of inclination for the machine frame.

The effect achieved by the compensation of inclination for the machine frame is that the operation of the separating device is ensured even in the event of inclinations of the terrain. In particular, the effect is thus achieved that the root crops and/or the additional material components move past the separating elements in the inoperative position at a constant distance.

In a further preferred refinement of the invention, the EDP control unit is designed for setting at least one separating device adjustment element, which is arranged on the separating device, depending on the inclination data. At least the separating device frame is mounted movably here relative to the machine frame. The separating device adjustment element is arranged in particular on the separating device frame. The separating device frame is in particular integral with a feed conveyor device frame or fixed immovably thereon. Alternatively, at least a pivoting of the separating device frame relative to the feed conveyor device frame about the roll axis, preferably about each pivot axis, is prevented. The feed conveyor device frame comprises in particular a bearing element on which deflecting elements of the feed conveyor device are rotatably arranged. The separating device adjustment element provides compensation of inclination for the separating device without the entire machine frame having to be pivoted for this purpose. In particular, as an alternative, the separating device frame is pivoted. For this purpose, it is mounted pivotably about the pitch axis and/or about the roll axis. The joint pivoting of the separating device frame and feed conveyor device frame particularly reliably ensures a uniform flight curve of the conveyable material in the region of the separating elements.

In an alternative or supplementary advantageous refinement of the invention, the separating device frame is mounted movably relative to the feed conveyor device frame. This design makes it possible to adapt the separating device to different inclinations without the separating device frame having to be moved for this purpose. As a result, the feed conveyor device can remain set in support of its conveying function independently of the inclination, whereas the position of the separating device frame is adapted depending on the inclination.

The separating device frame is preferably mounted relative to the feed conveyor device frame so as to be at least partially, in particular exclusively, movable, in particular displaceable, in a translatory manner in a direction parallel to the pitch axis and/or in the transverse direction. A lateral displacement of the transport device frame makes it possible in particular to react to an inclination which exists at least partially about the feed conveying direction. When the separating device is installed in such a manner that the feed conveying direction at least partially coincides with the direction of travel, an inclination of the machine about the roll axis can be compensated for by the displaceability of the separating device frame in the transverse direction. The effect achieved by this is that the conveyable material components that have a movement portion in the transverse direction because of the inclination in the drop step can nevertheless be reliably reached by the separating elements.

Alternatively or additionally, the separating device frame is preferably at least partially, in particular exclusively, movable, in particular displaceable, in a translatory manner relative to the feed conveyor device frame in a direction parallel to the roll axis, in the feed conveying direction and/or vertically. This movability makes it possible in particular to set the closeness of the separating device frame, and therefore also of the separating elements, with respect to the conveyable material components in the region of the drop step. In particular in the event of an inclination about an axis parallel to the transverse direction, in particular about the pitch axis, it is therefore possible to react to a steeper or shallower flight curve of the components and to maintain a constant distance of the separating elements in the inoperative position from the conveyable material components.

Alternatively or additionally thereto, the separating device frame is preferably mounted relative to the feed conveyor device frame so as to be at least partially pivotable about a pivot axis parallel to the pitch axis. In particular, the separating device frame is mounted here in such a manner that the distance of the separating elements in the inoperative position from the feed conveyor device is changed by pivoting the separating device frame. In a similar manner as by the previously described displacement of the separating device frame, the pivoting thereof makes it possible to adapt the separating device to different flight curves.

The EDP control unit is preferably designed for setting at least one diversion adjustment element, which is arranged on a diverting element for diverting additional materials sorted out by the separating device, depending on the inclination data. The diverting element is arranged in particular so as to be movable below the separating elements and relative to the machine frame, in particular so as to be at least partially displaceable in a direction parallel to the roll axis and/or to the pitch axis. In particular, the diverting element is designed as a baffle which does not revolve during operation and which serves for gravity-assisted diverting of components separated from the conveyable material. A movement of the diverting element depending on the inclination data makes it possible in turn to react to different flight curves of the conveyable material components. In particular, it is possible to avoid that components which have been detected by one separating element for separation then drop past the diverting element because of the inclination, or that components which are not to be separated unintentionally drop onto the diverting element because of the inclination. The preferred direction of the movability parallel to the roll axis or in the direction of the roll axis makes it possible in particular also to react to inclinations of the root crop harvester about the pitch axis.

Alternatively or additionally, the diverting element is designed so as to revolve during operation. In particular, it is a roller which revolves during operation or a belt which revolves during operation. The root crop harvester preferably has a stripping element which bears against the diverting element, which revolves during operation, or is spaced apart slightly from the diverting element, which revolves during operation, and in particular is fixed in position with respect to the machine frame. The stripping element is designed for removing undesirable additional materials adhering to the stripping element. The design of the diverting element so as to revolve during operation makes it possible to conduct the root crops more gently and in a more targeted way.

The root crop harvester particularly preferably has two further conveyor devices downstream of the separating device, of which one is designed for conveying away the root crops and one for conveying away the additional materials. In particular, the conveyor devices revolve in opposite directions during operation. The diverting element is preferably formed by at least one of the further conveyor devices. At least said further conveyor device is in particular at least partially, in particular exclusively, displaceable in its conveying direction and/or horizontally in order to be able to react to inclinations and the regions being displaced therewith and in which root crops and additional materials reach the further conveyor devices. In this case, the at least one further conveyor device simultaneously takes on a separating and a conveying function.

The EDP control unit is preferably designed for setting a conveying speed of the feed conveyor device depending on the inclination data. In the event of a determined inclination of the root crop harvester and an associated changed flight curve of the conveyable material components, this specific flight curve can be changed again by increasing or reducing the conveying speed of the feed conveyor device in the feed conveying direction. In particular, inclination-induced changes to the flight curve can be at least substantially compensated for by adapting the conveying speed. For this purpose, the EDP control unit is coupled in particular to a drive element of the feed conveyor device and sets the rotational speed of said drive element during operation.

The EDP control unit is preferably designed for setting a feed conveyor adjustment element, which is arranged on the feed conveyor device, depending on the inclination data. Of the feed conveyor device, in particular at least one end facing the separating elements is at least partially movable vertically relative to the separating device. In particular, the feed conveyor adjustment element is arranged in the region of this end on the feed conveyor device. By adapting the height of the feed conveyor device, from which the conveyable material passes into the region of the drop step, it can in turn be prevented that the conveyable material is unintentionally detected by the separating elements, and conveyable material components nevertheless remain reliably separable from the remaining conveyable material by means of the separating elements.

A supporting surface of the feed conveyor device is preferably adjacent to two imaginary boundary planes which extend in a planar manner both in the feed conveying direction and in a vertical direction. The outermost separating elements, as viewed in the feed conveyor device, are at least partially arranged outside the space between the boundary planes. In particular, at least one entire separating element is arranged outside the space on each side of the feed conveyor device; preferably, a plurality of separating elements are arranged outside the space on both sides. The extent of the separating device in the transverse direction therefore exceeds the extent of the supporting surface in the transverse direction. By means of this design of the separating device, conveyable material components can be separated from the remaining conveyable material by the separating device itself when said conveyable material components drop because of an inclination in particular about the roll axis laterally from the feed conveyor device in the region of the drop step.

The EDP evaluation unit is preferably designed in such a manner that the selection of the separating element to be set is undertaken depending on the inclination data, in particular on the inclination data representing an inclination about the roll axis or about the feed conveying direction. The actuation of the separating elements therefore depends both on the conveyable material data and on the inclination data. As a result, the actuation of the separating elements can be supported on a broader data basis and the separating device set up even more precisely in terms of target.

Particularly preferably, the EDP evaluation unit is designed in such a manner that it, upon receipt of first inclination data, which represent a first inclination not exceeding an inclination threshold value, and first conveyable material data, actuates a first separating element, wherein the EDP evaluation unit, upon receipt of further inclination data, which represent a further inclination exceeding the inclination threshold value, and the first conveyable material data, actuates a separating element arranged adjacent to the first separating element. This means that the EDP evaluation unit firstly, on the basis of the conveyable material data, in particular also on the basis of an identified additional material component, determines a separating element that is to be used for separating said additional material component, with the starting point being a horizontal orientation of the root crop harvester. Subsequently, the EDP evaluation unit processes the inclination data in such a manner that, when a (positive) inclination threshold value is exceeded and a (negative) further inclination threshold value is fallen short of, said EDP evaluation unit, starting from a separating element selected on the basis of the conveyable material data, selects a separating element which is adjacent thereto (in the one or other direction) or, in the event of a greater pitch, selects a more remote separating element for actuation. The effect which can be achieved by this, while preventing an additional structural outlay in respect of the width or mounting of the separating device, is that the latter precisely separates components that are to be separated from the conveyable material even in the event of an inclination, in particular about the roll axis. In particular, the EDP evaluation unit is also designed for the previously described and inclination-based setting of the chassis or drawbar or separating device adjustment element. In this way, the inclination in the region of the separating device can be changed by one or more of the adjustment elements at least to an extent such that the remaining inclination many times over justifies a change of the separating element to be actuated.

The object is furthermore achieved by a computer-implemented method using the root crop harvester described above and/or below. According to the method, first of all conveyable material data are recorded by the conveyable material sensor and inclination data are recorded by the inclination sensor. Subsequently, at least one adjustment signal is calculated by the EDP evaluation unit and/or the EDP control unit depending on the inclination data and/or depending on the conveyable material data. Subsequently, at least one of the fluid adjustment elements and/or at least one of the ejector adjustment element is actuated and/or the drawbar adjustment element, the chassis adjustment element, the feed conveyor adjustment element, the diversion adjustment element and/or the separating device adjustment element is set by means of the adjustment signal.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 6 shows a schematically illustrated top view of a part of a fourth root crop harvester according to the invention, in a first configuration.

FIG. 7 shows a schematically illustrated top view of the part of the fourth root crop harvester according to the invention in a second configuration.

FIG. 8 shows a schematically illustrated top view of a part of a fifth root crop harvester according to the invention.

FIG. 9 shows a perspective overall illustration of a sixth root crop harvester according to the invention.

DETAILED DESCRIPTION OF THE INVENTION

Figure 1:
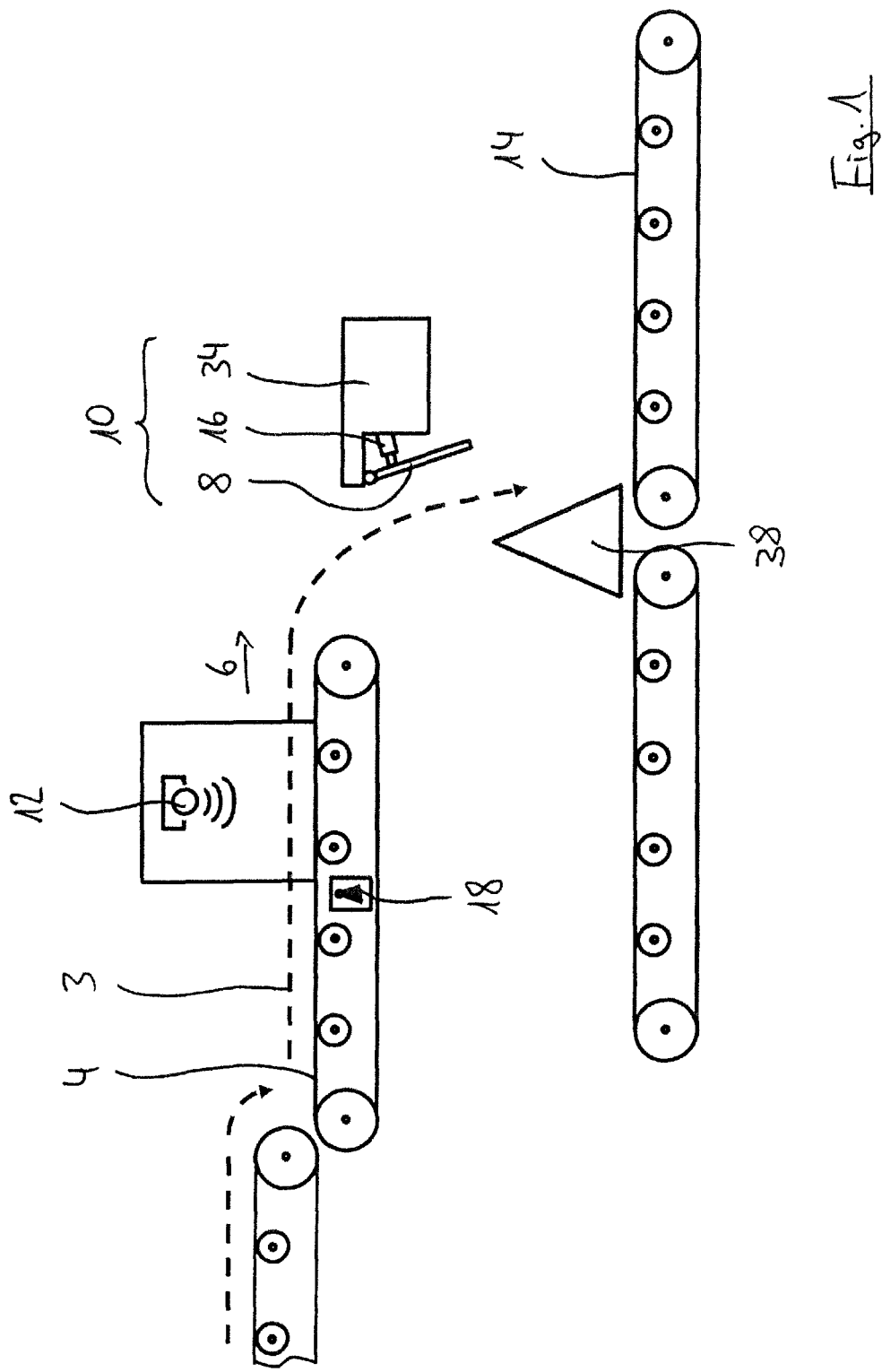
FIG. 1 shows a schematically illustrated side view of part a first root crop harvester according to the invention.

The features explained below of the exemplary embodiments according to the invention could also be subject matter of the invention individually or in other combinations than illustrated or described. If expedient, functionally identically acting parts are provided with identical reference numbers.

FIGS. 1 to 8 show at least one feed conveyor device 4 and a separating device 10 of different root crop harvesters 2 according to the invention. The feed conveyor device 4 is used to convey conveyable material consisting of harvested crop and additional materials in the feed conveying direction 6. The conveyable material thereby essentially describes the conveying path 3. A conveyable material sensor 12 for recording conveyable material data is arranged above the feed conveyor device 4, the conveyable material data being transmitted during operation to an EDP evaluation unit, not illustrated. In addition, an inclination sensor 18 is arranged on the feed conveyor device 4.

The separating device 10 of the feed conveyor device 4 is arranged downstream with respect to the conveying path 3. The separating device 10 comprises a plurality of separating elements 8 which are arranged one behind another in the perspective present in FIGS. 1 to 4, and therefore only one separating element 8 is in each case illustrated. The separating elements 8 are arranged pivotably on a separating device frame 34. In addition, the separating elements 8 are transferrable by an ejector adjustment element 16 from an inoperative position, in which the separating elements 8 are shown, into an ejection position, for which purpose they are pivoted in the direction of the conveying path 3.

A diverting element 38 is arranged below the separating device 10 (cf. FIG. 1). During operation, the harvested crop has to drop onto the right side of the stripping element 38 in order to be able to be conveying away from the further conveyor device 14. Additional material components separated from the harvested crop by the separating elements and ejected have to drop to the left of the tip of the stripping element 38 onto precisely that stripping element 38 or onto the conveyor belt shown the left.

Figure 2:
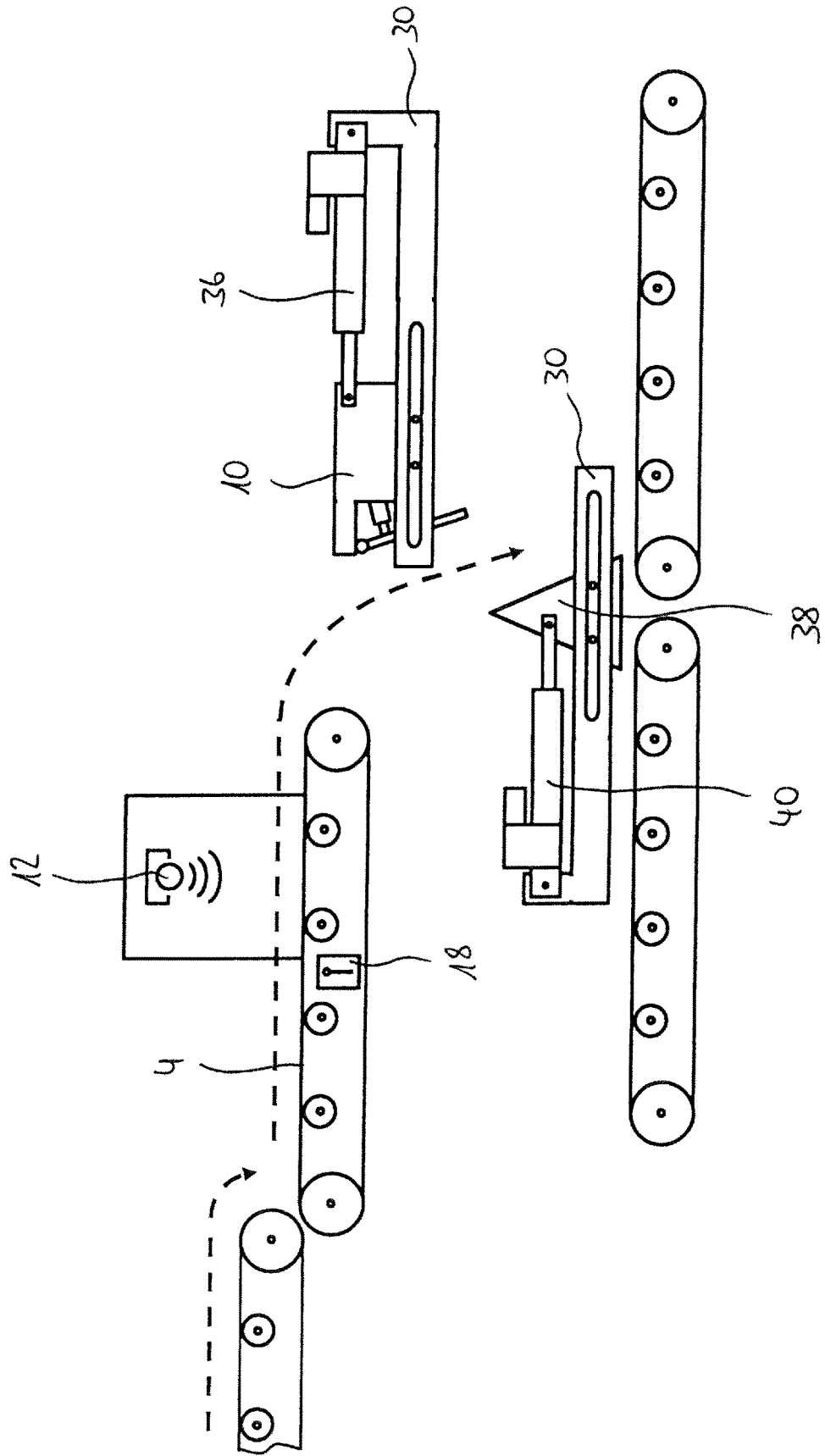
FIG. 2 shows a schematically illustrated side view of part of a second root crop harvester according to the invention in a first configuration.
Figure 3:
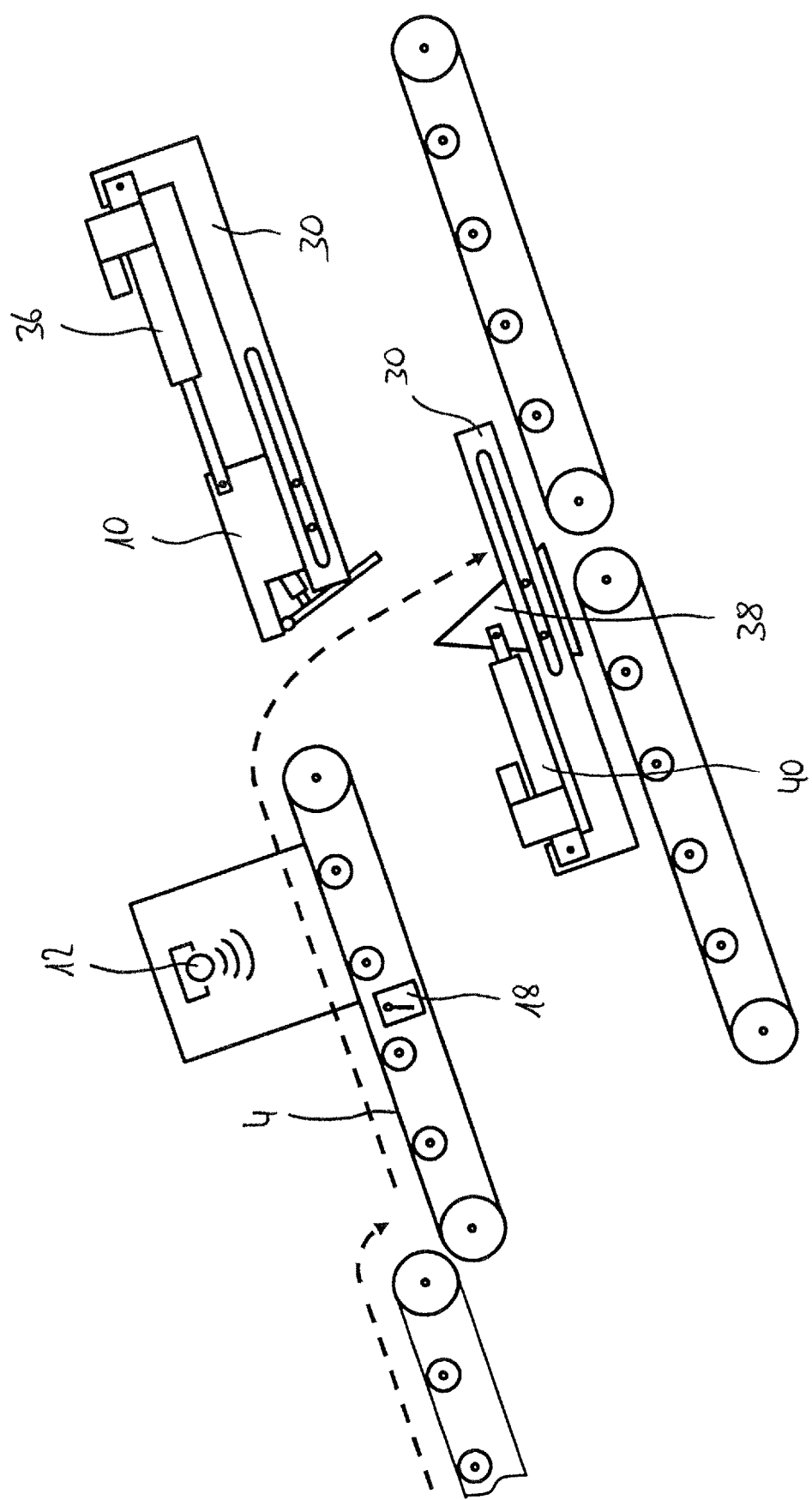
FIG. 3 shows a schematically illustrated side view of the part of the second root crop harvester according to the invention in a second configuration.
Figure 4:
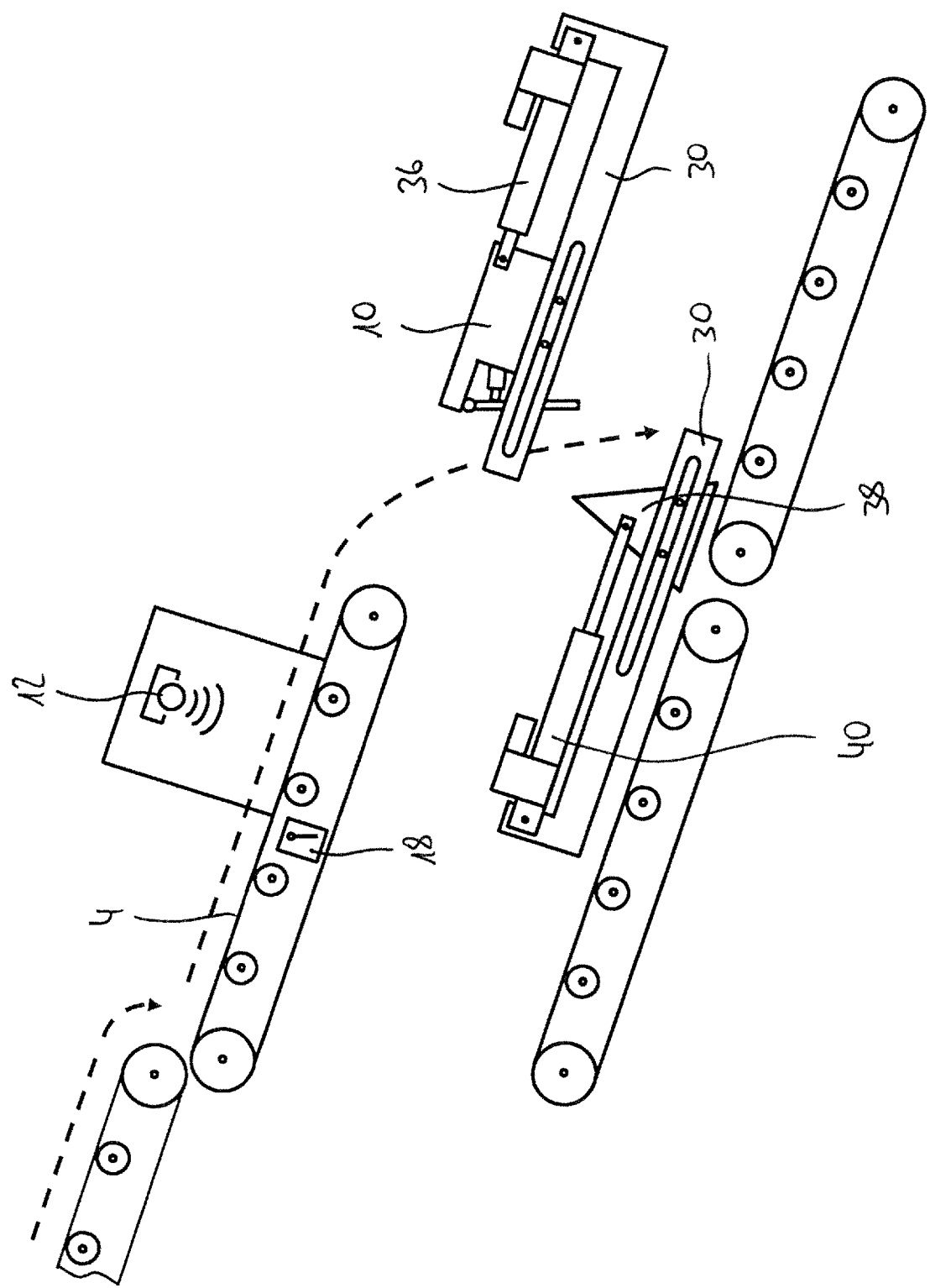
FIG. 4 shows a schematically illustrated side view of the part of the second root crop harvester according to the invention in a third configuration.

FIGS. 2 to 4 show the abovementioned components in a second root crop harvester 2 according to the invention. In the second root crop harvester 2, both the separating device 10 and the diverting element 38 are mounted displaceably in the feed conveying direction 6. The diverting element 38 is displaceable with respect to the machine frame 30 by an elongated hole thereon and can be set by means of a diversion adjustment element 40. In the same way, the separating device 10 can be set relative to the machine frame 30 by means of a separating device adjustment element 36. Both settings are predetermined by the EDP evaluation unit or the EDP control unit depending on the inclination recorded by the inclination sensor.

In FIG. 2, both the separating device 10 and the diverting element 38 are in a starting position since no inclination of the root crop harvester or of the feed conveyor device 4 in relation to a horizontal is measured by the inclination sensor 18, which here measures a potential inclination about the pitch axis.

In FIG. 3, an inclination of the harvester 2 counterclockwise in relation to the horizontal is measured by the inclination sensor 18, and therefore the conveying path 3 of the conveyable material is changed and the conveyable material in particular drops more steeply from the conveyor device 4. Accordingly, the separating device 10 and the diverting element 38 are displaced by the separating device adjustment element 36 and the diversion adjustment element 40 to the left in relation to their starting position in FIG. 2.

FIG. 4 shows the configuration of said parts of the second root crop harvester according to the invention in the case of an opposite inclination. Here, the diverting element 38 and the separating device 10 are displaced to the right in relation to their position in FIG. 2 in order to react to the now shallower flight curve in the conveying path 3.

Figure 5:
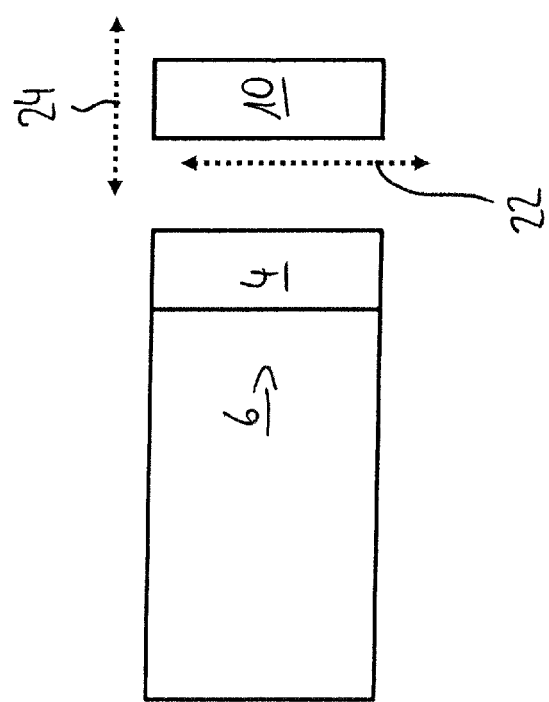
FIG. 5 shows a schematically illustrated top view of a part of a third root crop harvester according to the invention.

The third embodiment, shown schematically in FIG. 5, of the root crop harvester according to the invention shows a separating device 10 which is mounted displaceably in relation to the machine frame 30 and in relation to the feed conveyor device 4 both along a roll axis 24, which is parallel to the feed conveying direction 6, and along a pitch axis 22.

FIGS. 6 and 7 show a part of a fourth root crop harvester according to the invention, the inclination sensor 18 of which measures an inclination which takes place at least partially about the roll axis 24 which runs parallel to the feed conveying direction 6. The outermost separating elements 8 are arranged here outside the intermediate space spanned by the boundary planes 42, the boundary planes 42 being adjacent to the sides of a supporting surface of the feed conveyor device 4.

In the operating situation according to FIG. 6, no inclination of the root crop harvester 2 is measured and the conveying paths 3 run correspondingly rectilinearly along the separating device 10 in the feed conveying direction 6. FIG. 7 shows the extent to which an inclination, measured by the inclination sensor 18, leads to conveying paths 3 which partially run transversely with respect to the feed conveying direction 6. For taking this profile into consideration, the selection of the separating elements 8 that are to be actuated depends in this embodiment on the measured inclination, and therefore, for example in FIG. 7, assuming identical conveyable material data in the operating situations according to FIG. 6 and FIG. 7, different separating elements are actuated than in FIG. 6.

FIG. 8 shows a similar illustration as FIGS. 6 and 7, wherein here the separating device 10 is mounted so as to be displaceable relative to the machine frame 30 transversely with respect to the feed conveying direction 6. A separating device adjustment element 36 is in turn arranged on the separating device frame 34, as a result of which the separating device 10 is displaceable relative to a machine edge 30. In the embodiment shown, the root crop harvester 2 or the separating device 10 reacts to an inclination determined by the inclination sensor 18 in such a manner that the separating device is displaced laterally, and therefore given conveyable material data which correspond to those in the operating situation according to FIG. 6, the same conveying elements 8 are also actuated, but said conveying elements are in a displaced position.

FIG. 9 shows a root crop harvester 2 according to the invention in a side view. The root crop harvester 2 can be coupled to a tractor by the coupling element 32 and moves in the direction of travel 20 during operation. The root crop harvester 2 has inclination sensors both for measuring an inclination of the root crop harvester 2 about the roll axis 24 and for measuring an inclination about the pitch axis 22. The inclination sensors 18 like the separating device 10 are not visible in the illustration provided. In the region of the suspension of the chassis element 28, which is in the form of a wheel, the root crop harvester 2 has a chassis adjustment element 26 by means of which the chassis element 28 is coupled to the machine frame 30.

The invention claimed is:

1. A root crop harvester comprising:
   a feed conveyor device for conveying conveyable material, the conveyable material including harvested crop and additional materials, in a feed conveying direction;
   a separating device having a plurality of separating elements for separating the additional materials from the harvested crop;
   a conveyable material sensor which is coupled to an EDP evaluation unit and, during operation, is directed toward the conveyable material for recording conveyable material data; and
   at least one inclination sensor measuring an inclination of the root crop harvester or of the separating device and/or of the feed conveyor device, and for outputting inclination data to an EDP control unit coupled to the inclination sensor,
   wherein the plurality of separating elements, as viewed in the feed conveying direction, are at least partially arranged next to one another and are actuable individually by the EDP evaluation unit depending on the conveyable material data.

2. The root crop harvester as claimed in claim 1, wherein the separating device is arranged downstream with respect to the feed conveyor device.

3. The root crop harvester as claimed in claim 1, wherein the separating elements are arranged on a separating device frame so as to be movable from an inoperative position into an ejection position and back, and each separating element is assigned at least one ejector adjustment element.

4. The root crop harvester as claimed in claim 1, wherein the separating elements each form at least one fluid outlet opening.

5. The root crop harvester as claimed in claim 1, wherein the at least one inclination sensor measures an inclination about a pitch axis oriented transversely with respect to the direction of travel and/or to measure an inclination about a roll axis oriented in the direction of travel.

6. The root crop harvester as claimed in claim 1, wherein the EDP control unit sets at least one chassis adjustment element, which adjusts at least one chassis element relative to a machine frame, depending on the inclination data.

7. The root crop harvester as claimed in claim 1, wherein the EDP control unit sets at least one drawbar adjustment element, which adjusts a coupling element, which couples the root crop harvester to a tractor, relative to the machine frame, depending on the inclination data.

8. The root crop harvester as claimed in claim 1, wherein the EDP control unit sets at least one separating device adjustment element, which is arranged on the separating device depending on the inclination data, wherein at least the separating device frame is mounted movably relative to the machine frame.

9. The root crop harvester as claimed in claim 8, wherein the separating device frame is arranged on the machine frame so as to be at least partially pivotable, wherein the separating device frame is coupled to the feed conveyor device in such a manner that pivoting of the separating device frame relative to a feed conveyor device frame of the feed conveyor device about the roll axis is prevented.

10. The root crop harvester as claimed in claim 8, wherein the separating device frame is mounted movably relative to the feed conveyor device frame.

11. The root crop harvester as claimed in claim 10, wherein the separating device frame is mounted relative to the feed conveyor device frame so as to be at least partially movable in a translatory manner in a direction parallel to the pitch axis.

12. The root crop harvester as claimed in claim 10, wherein the separating device frame is mounted relative to the feed conveyor device frame so as to be at least partially movable in a translatory manner in a direction parallel to the roll axis, in the feed conveying direction and/or vertically.

13. The root crop harvester as claimed in claim 10, wherein the separating device frame is mounted relative to the feed conveyor device frame so as to be at least partially pivotable about a pivot axis parallel to the pitch axis.

14. The root crop harvester as claimed in claim 1, wherein the EDP control unit sets at least one diversion adjustment element, which is arranged on a diverting element for diverting additional materials sorted out by the separating device, said diverting element being movable below the separating elements and relative to the machine frame, depending on the inclination data.

15. The root crop harvester as claimed in claim 14, wherein the diverting element revolves during operation.

16. The root crop harvester as claimed in claim 1, wherein the EDP control unit sets a conveying speed of the feed conveyor device depending on the inclination data.

17. The root crop harvester as claimed in claim 1, wherein the EDP control unit sets a feed conveyor adjustment element, which is arranged on the feed conveyor device, of which at least one end facing the separating elements is at least partially vertically movable relative to the separating device, depending on the inclination data.

18. The root crop harvester as claimed in claim 1, wherein a supporting surface of the feed conveyor device is adjacent to two boundary planes extending in the feed conveying direction and vertically, wherein the outermost separating elements, as viewed in the feed conveying direction, are at least partially arranged outside the space between the boundary planes.

19. The root crop harvester as claimed in claim 1, wherein the EDP evaluation unit is designed in such a manner that the selection of the separating element to be set is undertaken depending on the inclination data.

20. The root crop harvester as claimed in claim 19, wherein the EDP evaluation unit actuates a first separating unit upon receipt of first inclination data that represents a first inclination not exceeding an inclination threshold value, and first conveyable material data, wherein the EDP evaluation unit, upon receipt of further inclination data, which represent a further inclination exceeding the inclination threshold value, and the first conveyable material data, actuates a separating element arranged adjacent to the first separating element.

21. A computer-implemented method using a root crop harvester as claimed in claim 1, the method comprising the steps of:
   recording conveyable material data by the conveyable material sensor,
   recording inclination data by the inclination sensor,
   calculating at least one adjustment signal depending on the inclination data and/or depending on the conveyable material data by the EDP evaluation unit and/or the EDP control unit,
   actuating at least one fluid adjustment element and/or at least one ejector adjustment element and/or setting a drawbar adjustment element, a chassis adjustment element, a feed conveyor adjustment element, a diversion adjustment element and/or a separating device adjustment element based on the adjustment signal.

\* \* \* \* \*